(12) United States Patent
Kobayashi et al.

(10) Patent No.: US 10,495,155 B2
(45) Date of Patent: Dec. 3, 2019

(54) TORQUE LIMITER AND DRIVE DEVICE

(71) Applicant: MINEBEA MITSUMI Inc., Nagano (JP)

(72) Inventors: Yoshinori Kobayashi, Fujisawa (JP); Tomonori Sumi, Saitama (JP); Shigeru Iwase, Akishima (JP)

(73) Assignee: MINEBEA MITSUMI INC., Nagano (JP)

( * ) Notice: Subject to any disclaimer, the term of this patent is extended or adjusted under 35 U.S.C. 154(b) by 191 days.

(21) Appl. No.: 15/671,311

(22) Filed: Aug. 8, 2017

(65) Prior Publication Data

US 2017/0335895 A1  Nov. 23, 2017

Related U.S. Application Data

(63) Continuation of application No. PCT/JP2016/053712, filed on Feb. 8, 2016.

(30) Foreign Application Priority Data

Feb. 16, 2015 (JP) .................................. 2015-028107

(51) Int. Cl.
*F16D 7/02* (2006.01)
*F16H 1/22* (2006.01)
(Continued)

(52) U.S. Cl.
CPC ............. *F16D 7/022* (2013.01); *F16D 7/027* (2013.01); *F16D 43/216* (2013.01); *F16H 1/22* (2013.01);
(Continued)

(58) Field of Classification Search
CPC ........ F16D 7/022; F16D 7/027; F16D 43/216; F16D 7/02; F16H 35/10; F16H 35/18
See application file for complete search history.

(56) References Cited

U.S. PATENT DOCUMENTS 2,913,082 A   11/1959   Becknell
3,585,817 A    6/1971   McAfferty et al.
(Continued)

FOREIGN PATENT DOCUMENTS

CN    2898348 Y    5/2007
DE     740154 C   10/1943
(Continued)

OTHER PUBLICATIONS

English translation of Written Opinion for corresponding International Application No. PCT/JP2016/053712 dated May 17, 2016.
(Continued)

*Primary Examiner* — Huan Le
(74) *Attorney, Agent, or Firm* — Pearne & Gordon LLP

(57) ABSTRACT

A torque limiter includes: a first rotary member configured to be rotated by a drive source; at least one first friction member engaged with the first rotary member; at least one second friction member arranged so as to overlap the first friction member, and configured to rotate with rotation of the first rotary member by using frictional force generated between the second friction member and the first friction member; and a second rotary member engaged with the second friction member. It is preferable that the first rotary member and the second rotary member be pivotally supported by an identical rotary shaft, and that, while either the first rotary member and the second rotary member is fixed to the rotary shaft, the other one be supported so as to be rotatable about the rotary shaft.

10 Claims, 10 Drawing Sheets

(51) Int. Cl.
*F16D 43/21* (2006.01)
*A47K 13/26* (2006.01)
*F16H 1/20* (2006.01)
*F16H 35/10* (2006.01)

(52) U.S. Cl.
CPC ............... *A47K 13/26* (2013.01); *F16H 1/20* (2013.01); *F16H 35/10* (2013.01)

(56) References Cited

U.S. PATENT DOCUMENTS

| | | | |
|---|---|---|---|
| 4,949,587 | A | 8/1990 | Oka et al. |
| 2008/0090664 | A1 | 4/2008 | Campbell et al. |
| 2010/0243398 | A1 | 9/2010 | Nagami |

FOREIGN PATENT DOCUMENTS

| | | | |
|---|---|---|---|
| JP | 61-63057 U | | 4/1986 |
| JP | 63-080330 U | | 5/1988 |
| JP | 63080330 U | * | 5/1988 |
| JP | 8-7147 Y2 | | 3/1996 |
| JP | 10-148219 A | | 6/1998 |
| JP | 2001-074120 A | | 3/2001 |
| JP | 2004-104902 A | | 4/2004 |
| JP | 2008-095322 A | | 4/2008 |
| JP | 5094881 B2 | | 12/2012 |
| JP | 2014-149013 A | | 8/2014 |
| SU | 672398 A1 | | 7/1979 |
| SU | 1268841 A | | 11/1986 |

OTHER PUBLICATIONS

Report of Reconsideration by Examiner before Appeal dated Dec. 4, 2018 for corresponding Japanese Application No. 2018-011857.
International Search Report for corresponding International Application No. PCT/JP2016/053712 dated May 17, 2016.
Chinese Office Action dated Dec. 25, 2018 for corresponding Chinese Application No. 201680009482.4 and English translation.
Extended European Search Report for corresponding European Application No. 16752335.6 dated Nov. 14, 2018.

* cited by examiner

TORQUE LIMITER AND DRIVE DEVICE

CROSS-REFERENCE TO RELATED APPLICATION(S)

This application is a continuation of PCT international application Ser. No. PCT/JP2016/053712 filed on Feb. 8, 2016 which designates the United States, and which claims the benefit of priority from Japanese Patent Application No. 2015-028107, filed on Feb. 16, 2015; the entire contents of which are incorporated herein by reference.

BACKGROUND OF THE INVENTION

1. Field of the Invention

The present invention relates to a torque limiter and a drive device.

2. Description of the Related Art

Toilets equipped with an electrically powered toilet seat/lid opening and closing function that each include a drive unit to automatically open and close a toilet seat or a toilet lid are commercially available. A drive unit for such a function includes a torque limiter in order that a gear and a motor included in the drive unit may be protected when a person applies an excess load to a toilet seat or a toilet lid by manually opening and closing the toilet seat or the toilet lid. As such a torque limiter, one including a ratchet has been proposed (see Patent Literature 1).

In a torque limiter disclosed in Patent Literature 1 (Japanese Patent Application Laid-open No. 2014-149013), upon application of an excess load exceeding previously determined torque (certain torque) to a toilet seat or a toilet lid when the toilet seat or the toilet lid is opened or closed, ratchet elements that have been engaged become disengaged, so that transmission of the excess load is shut off. Disadvantageously, however, rotation of the ratchet elements then causes mechanical noise. If the certain torque is set relatively high for the purpose of suppressing the frequencies of occurrences of such mechanical noise, peripheral components such as a motor and a gear need to have sufficiently high strength so as to be tolerable against at least an excess load that does not exceed the certain torque, and the component costs increase by satisfying such need. Furthermore, in the case of a ratchet made of resin, large variations are seen in torque (limit torque) at which transmission of excess loads is actually shut off, and the variations in limit torque may become larger over time because the ratchet itself deforms when rotating.

Problems similar to the above occur when the torque limiter is used for automatically opening and closing any movable objects other than a toilet seat.

The present invention has been made in view of the above situation, and is aimed at providing a torque limiter and a drive device that are capable of suppressing influence of an excess load to components thereof and silently operable.

SUMMARY OF THE INVENTION

It is an object of the present invention to at least partially solve the problems in the conventional technology. A torque limiter according to an embodiment comprises a first rotary member configured to be rotated by a drive source, at least one first friction member engaged with the first rotary member, at least one second friction member arranged so as to overlap the first friction member, and configured to rotate with rotation of the first rotary member by using frictional force generated between the second friction member and the first friction member, and a second rotary member engaged with the second friction member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
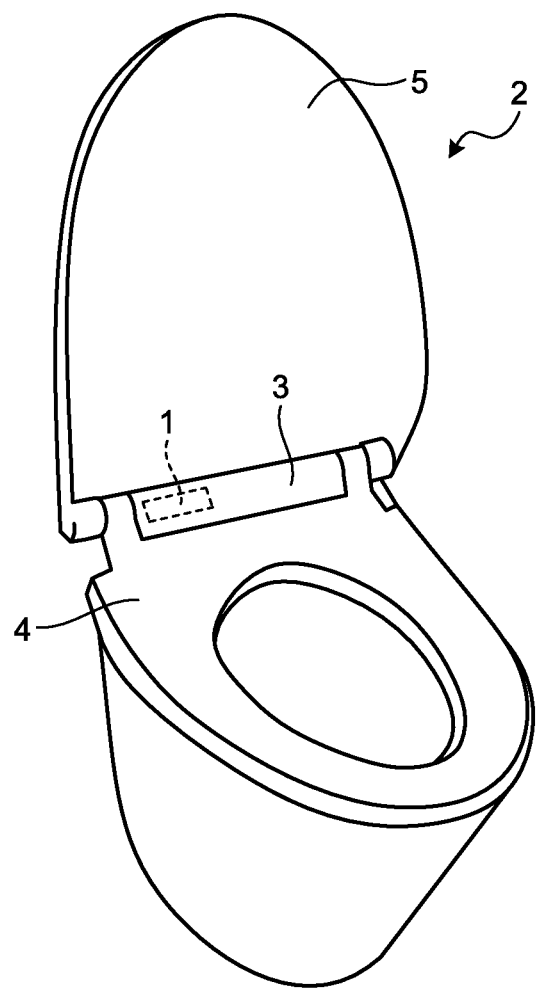
FIG. 1 is a perspective view of an electrically powered toilet-seat equipped toilet in which a drive unit including a torque limiter according to a first embodiment of the present invention is arranged in place.

A torque limiter according to an embodiment, wherein the first rotary member and the second rotary member are pivotally supported by an identical rotary shaft, and while either of the first rotary member and the second rotary member is fixed to the rotary shaft, the other one is supported so as to be rotatable about the rotary shaft.

A torque limiter according to an embodiment further comprises an elastic member attached to the rotary shaft and a tightener attached to the rotary shaft, wherein the elastic member biases the first rotary member and the second rotary member in an identical direction, and the tightener anchors the elastic member to the rotary shaft.

A torque limiter according to an embodiment, wherein the tightener controls force for the biasing.

A torque limiter according to an embodiment, wherein the first friction member and the second friction member are housed in a housing part in the first rotary member while being stacked on each other, and the second rotary member is arranged while pressing a stack of the first friction member and the second friction member.

A torque limiter according to an embodiment, wherein the first friction member and the second friction member have annular shapes, the first friction member has an engaging part on an outer circumferential portion thereof, the engaging portion being configured to engage with an engagement counterpart formed in the housing part in the first rotary member, the second friction member has an engaging part on an inner circumferential portion thereof, and the second rotary member penetrates a hollow part formed in the first friction member and has an engagement counterpart with which the engaging part of the second friction member engages.

A torque limiter according to an embodiment, wherein the second rotary member is constructed of a rotary shaft that pivotally supports the first rotary member in a manner enabling the first rotary member to rotate, the first friction member is pivotally supported by the rotary shaft so as to be rotatable, and the rotary shaft is inserted through and fitted with the second friction member.

A torque limiter according to an embodiment, wherein the rotary shaft includes a large-diameter part and a small-diameter part having a diameter smaller than the large-diameter part, and has a step portion between the large-diameter part and the small-diameter part, the first friction member and the second friction member are housed in a housing part in the first rotary member while being stacked on each other, and the rotary shaft pivotally supports the first friction member and the second friction member at the small-diameter part and presses a stack of the first friction member and the second friction member at the step portion.

A torque limiter according to an embodiment, wherein at least one of the at least one friction member and the at least one second friction member includes a plurality of such friction members, and the first friction members and the second friction members are arranged while being alternately stacked.

A torque limiter according to an embodiment, wherein the first friction member and the second friction member transmit rotative force to the second friction member by using frictional force, the rotative force from the first friction member having been generated by rotation of the first rotary member, and, when an excess load larger than a maximum static frictional force between the first friction member and the second friction member is applied to the first rotary member, the excess load applied to the first rotary member is not transmitted to the second rotary member because the first friction member slips on the second friction member.

A torque limiter according to an embodiment, wherein the first rotary member and the second rotary member are gears, and the first friction member and the second friction member are plate-shaped.

A drive device according to an embodiment comprises a torque limiter according to an embodiment, a drive unit configured to drive and rotate the first rotary member, and a transmission unit configured to transmit rotation of the second rotary member to a target to be driven.

The following describes embodiments of torque limiters and drive units according to the present invention in detail with reference to the drawings. These embodiments are not intended to limit the present invention. Throughout the drawings, the same reference signs are assigned to the same or corresponding elements as appropriate.

First Embodiment

As a first embodiment of the present invention, a drive device including a torque limiter is described. While being applicable to various apparatuses, this drive device is described below through an example in which the drive device is applied to an opening and closing device that automatically opens and closes a toilet seat or a toilet lid.

A drive unit 1 according to the first embodiment is arranged inside a casing 3 of an electrically powered toilet-seat equipped toilet 2 and operable to drive a toilet seat 4 or a lid 5 so as to open and close the toilet seat 4 or the lid 5. While the following example describes the drive unit that is operable to open and close the toilet seat 4 in order to facilitate understanding, the drive unit is similarly capable of opening and closing the lid 5.

Figure 2:
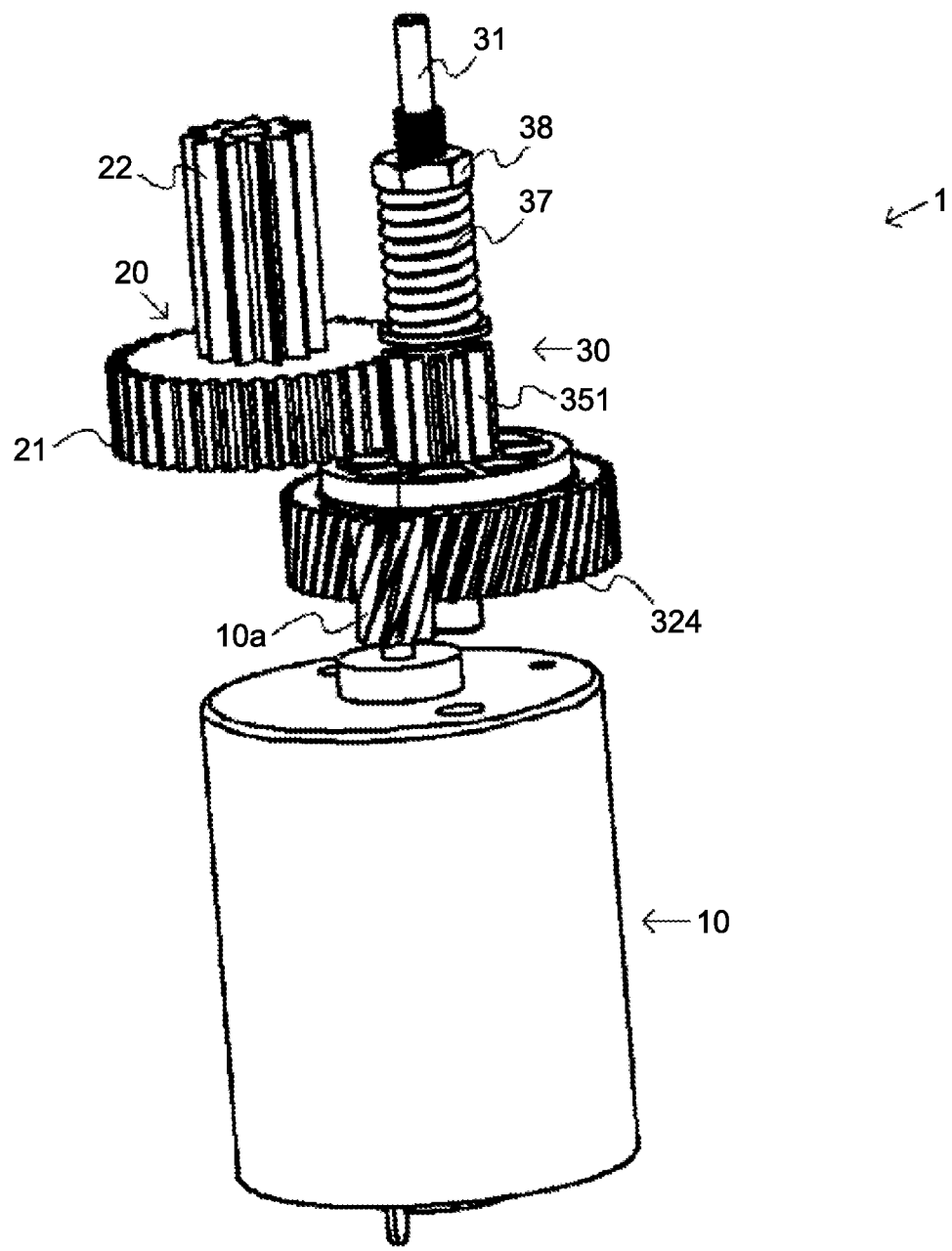
FIG. 2 is a perspective view of the drive unit including the torque limiter according to the first embodiment.

As illustrated in FIG. 2, the drive unit 1 according to the first embodiment includes a motor 10, a first gear part 20, and a torque limiter 30. The first gear part 20 is operable to transmit rotative force generated by the motor 10, via components such as a sequence of gears (not illustrated), to a turning shaft (opening/closing drive shaft) of the toilet seat 4. The torque limiter 30 is operable both to limit torque transmitted between the first gear part 20 and the motor 10 and to transmit rotative force generated by the motor 10 to the first gear part 20.

The motor 10 is composed of a stepping motor or the like and functions as a drive source and a power source for opening and closing operation on the toilet seat 4. A gear 10a is attached to the front end of an output rotary shaft of the motor 10. Drive signals are supplied to the motor 10 via a lead wire (not illustrated). When supplied with a drive signal, the motor 10 rotates the output rotary shaft. Motors applicable thereto are not particularly limited and include a direct-current (DC) motor and a DC brushless motor in addition to a stepping motor.

The first gear part 20 is a member for transmitting, to the toilet seat 4, torque transmitted from the motor 10 via the torque limiter 30. The toilet seat is an object to be driven. The first gear part 20 is made of resin or the like and includes a large-diameter gear 21 and a small-diameter gear 22 coaxially fixed to the large-diameter gear 21. The small-diameter gear 22 is coupled directly, or via a sequence of gears, to a gear coupled to the turning shaft (opening/closing drive shaft) of the toilet seat 4. The large-diameter gear 21 is meshed with a third gear 351, to be described later, of the torque limiter 30.

Figure 3:
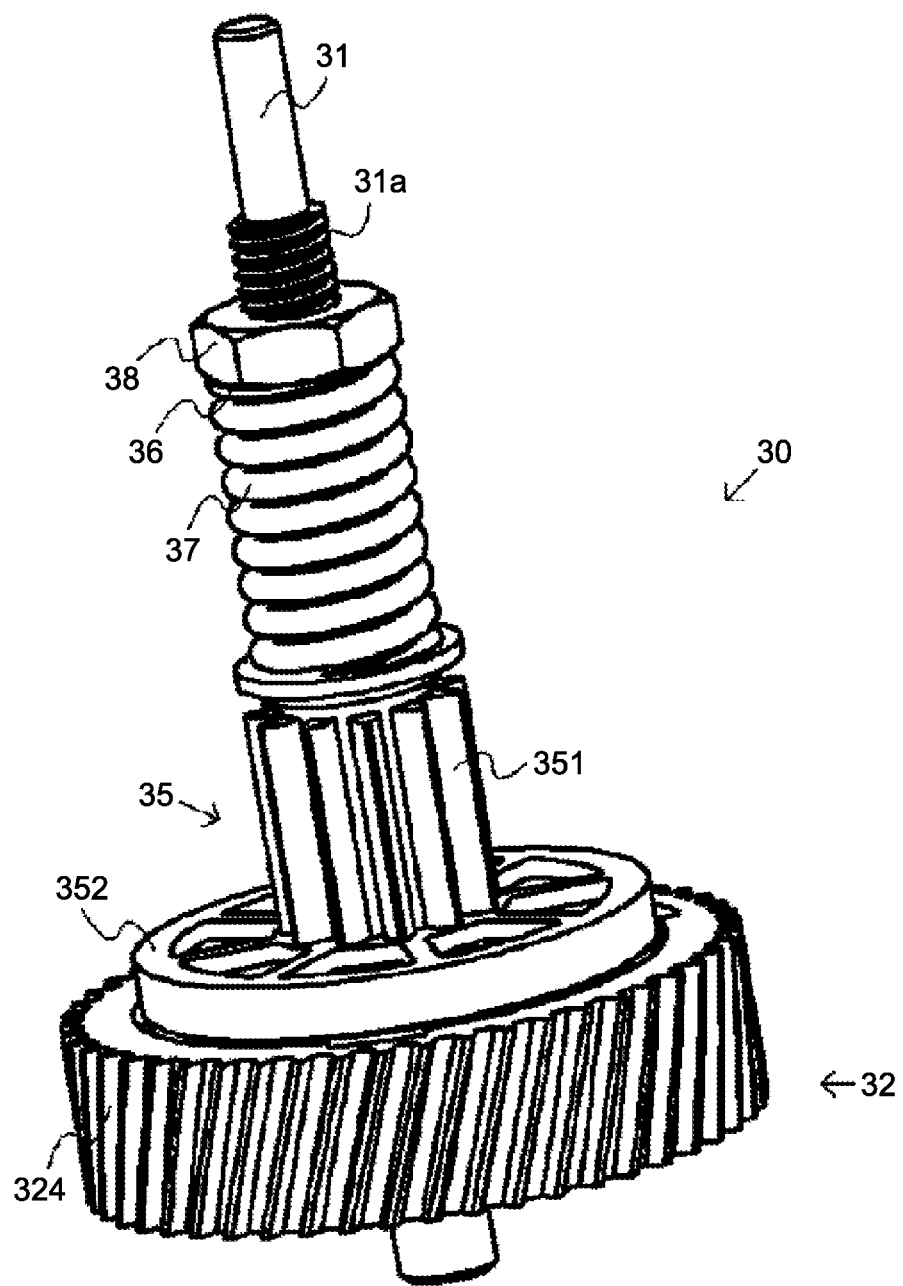
FIG. 3 is a perspective view of the torque limiter according to the first embodiment.
Figure 4:
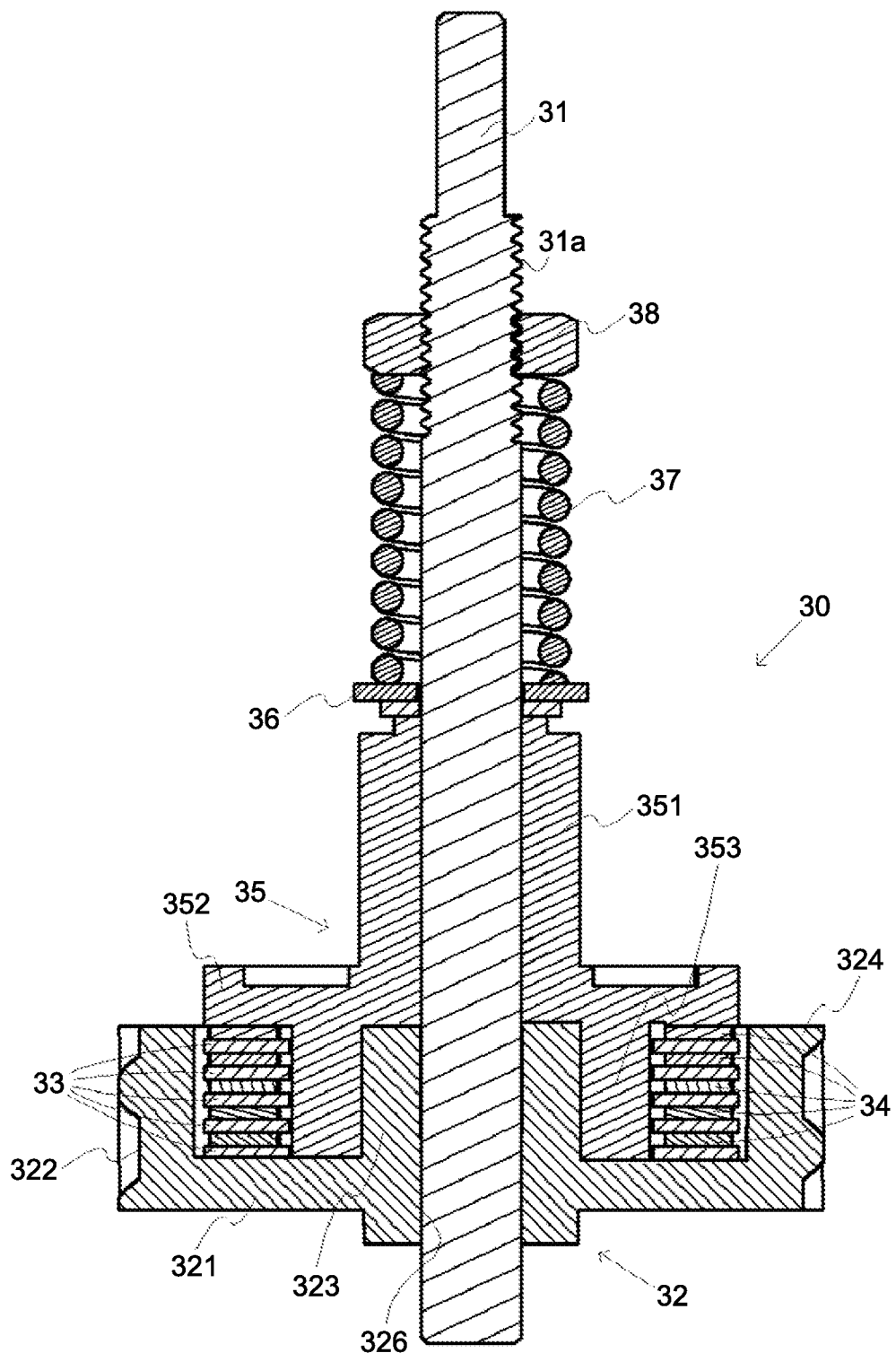
FIG. 4 is a sectional view of the torque limiter according to the first embodiment.
Figure 5:
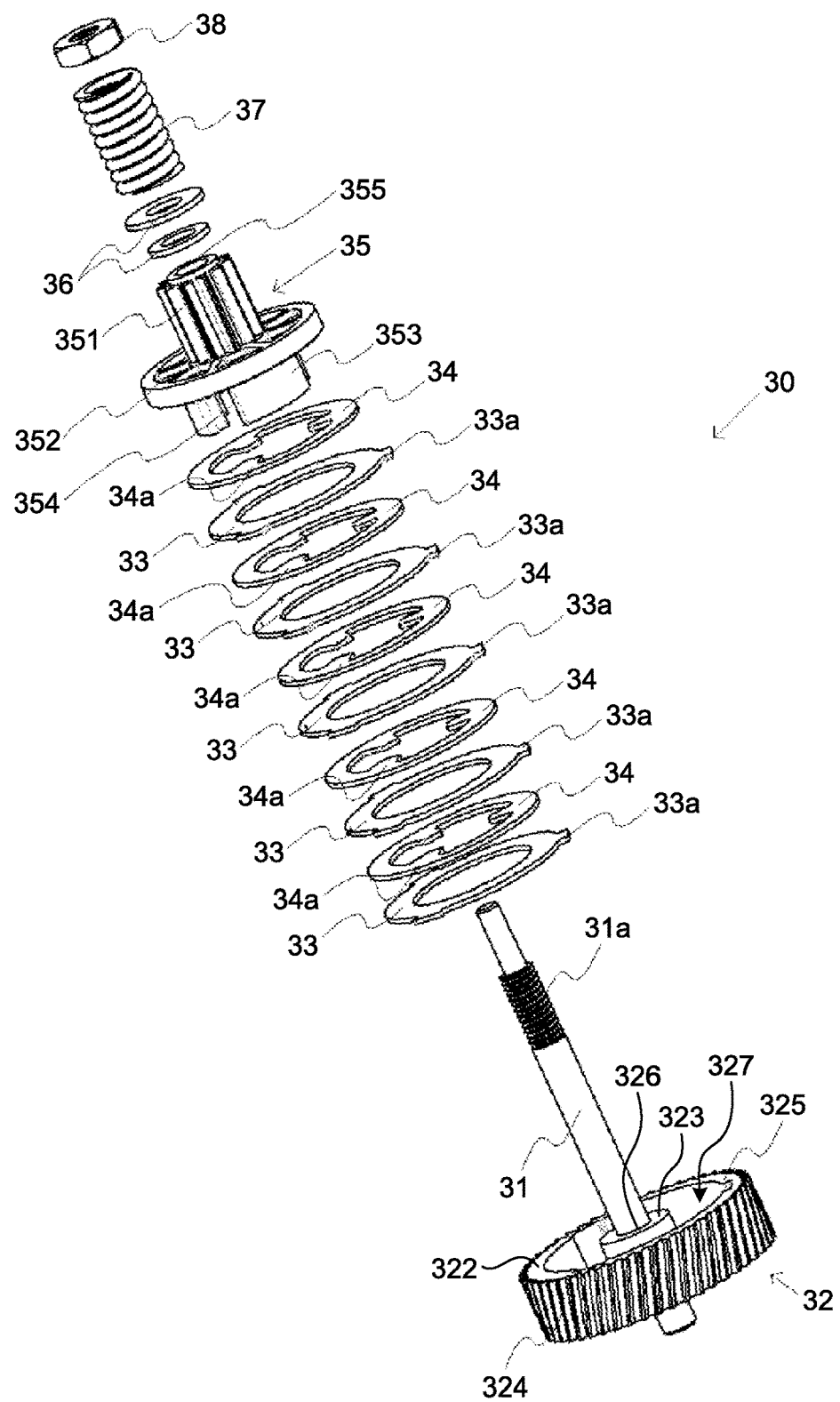
FIG. 5 is an exploded view of the torque limiter according to the first embodiment.

The torque limiter 30 is a safety device that limits transmitted torque, and includes a shaft 31, a second gear part 32, first friction plates 33, second friction plates 34, a third gear part 35, a washer 36, a spring 37, and a nut 38 as illustrated in FIGS. 3 to 5.

The shaft 31 is made of metal or the like, and serves as the center of rotation of this torque limiter 30.

The second gear part 32 is a rotary member fixed to the shaft 31 and configured to be driven by the motor 10. The second gear part 32 is made of resin or the like and, as illustrated in FIG. 4, includes a disc-like bottom plate 321, and an outer circular cylindrical part 322 and an inner circular cylindrical part 323 that are formed on the bottom plate 321 integrally therewith.

Figure 6A:
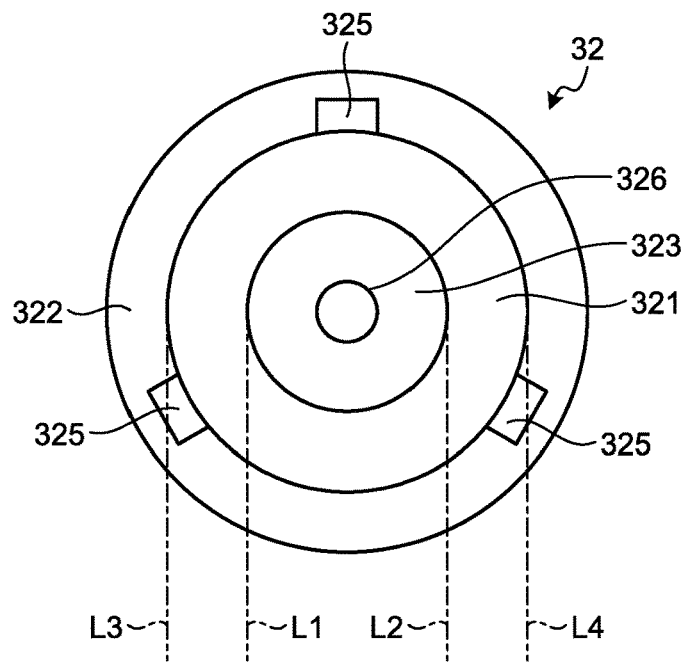
FIG. 6A is a plan view of a second gear part.

The outer circular cylindrical part 322 is provided so as to stand at the edge of the bottom plate 321, and has a second gear 324 formed on the outer circumferential surface thereof and meshed with the gear 10a attached to the output rotary shaft of the motor 10. As illustrated in FIG. 6A, notches (engagement counterparts) 325 are formed at intervals of 120 degrees in a rotationally symmetric fashion in the inner circumferential surface of the outer circular cylindrical part 322. The notches are engaged with projections 33a to be described later of each of the first friction plates 33. In FIGS. 6A, 6B, 6C, and 6D, the alternate long and short dash lines L1 and L2 indicate the outer diameter of the inner circular cylindrical part 323 and the alternate long and short dash lines L3 and L4 indicate the inner diameter of the outer circular cylindrical part 322.

The inner circular cylindrical part 323 is provided integrally with the central part of the bottom plate 321 so as to stand therefrom, and has a shaft hole 326 formed therethrough that the shaft 31 is inserted through and fitted with.

Figure 6B:
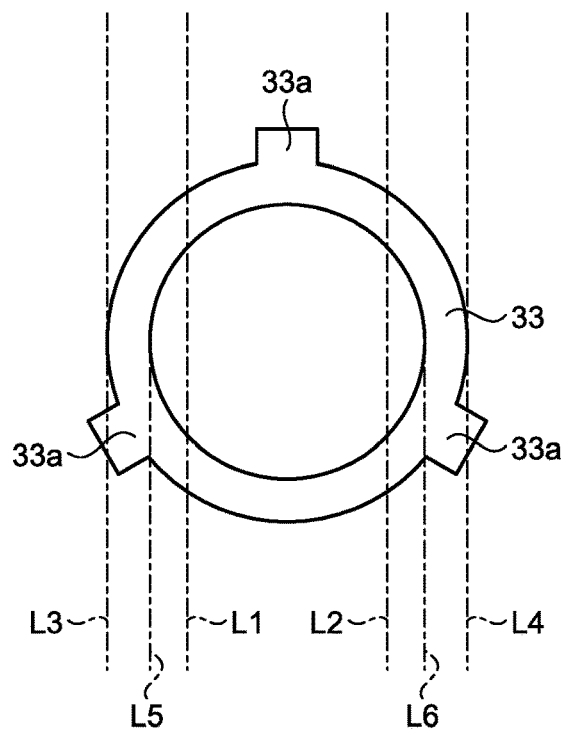
FIG. 6B is a plan view of a first friction plate.

Each of the first friction plates 33 is composed of a metal plate, a resin plate, or the like and has an annular shape as illustrated in FIG. 6B. The first friction plate 33 is formed so as to have an outer diameter slightly smaller than the inner diameter of the outer circular cylindrical part 322 of the second gear part 32 and have an inner diameter formed slightly larger than the outer diameter (indicated by the alternate long and short dash lines L5 and L6) of standing parts 353 to be described later formed in the third gear part 35. Projections (engaging parts) 33a are formed on the outer circumferential edge of the first friction plate 33. The projections engage with the three notches 325 formed in the outer circular cylindrical part 322 of the second gear part 32.

Figure 6C:
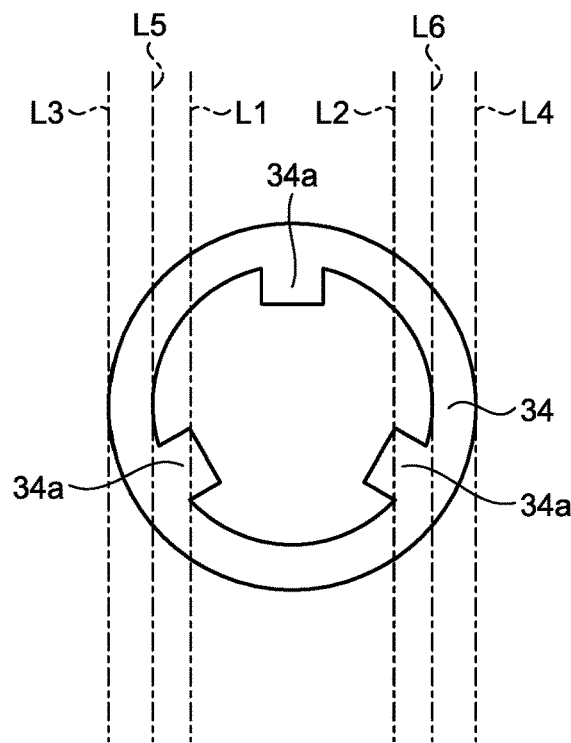
FIG. 6C is a plan view of a second friction plate.

Each of the second friction plate 34 is composed of a metal plate, a resin plate, or the like and has an annular shape as illustrated in FIG. 6C. Reasons such as the presence of a burr on an end portion of any friction plate make the contact area between adjacent ones of the friction plates deficient in size. In order to avoid such deficiency, the sizes of the inner diameters and the outer diameters of the first friction plate 33 and the second friction plate 34 may be designed so that the first friction plates 33 and the second friction plates 34 can be stacked without edge portions of adjacent ones of those friction plates placed over each other. Protrusions (engaging parts) 34a are formed at intervals of 120 degrees in a rotationally symmetric fashion in the inner circumferential edge of the second friction plate 34. The protrusions engage with gaps 354 between each adjacent ones of the standing parts 353 formed in the third gear part 35.

As illustrated in FIG. 4 and FIG. 5, the five first friction plates 33 and the five second friction plates 34 are alternately stacked and are housed in a hollow part 327 of the second gear part 32. When housed therein, the projections 33a of the first friction plates 33 are inserted in the notches 325 formed in the outer circular cylindrical part 322 of the second gear part 32. The friction plates that are made of metal plates are less prone to warping and have higher strength, and therefore can provide higher reliability, than those that are made of resin plates.

The third gear part 35 is a rotary member rotatably supported by the shaft 31. The third gear part 35 is made of resin or the like and includes the third gear 351, a disc part 352, and the standing parts 353. The third gear 351 is formed with a smaller diameter than the second gear part 32, is provided on the central part of the disc part 352 so as to stand, has a gear formed on the outer circumferential surface thereof, and is meshed with the large-diameter gear 21 of the first gear part 20.

Figure 6D:
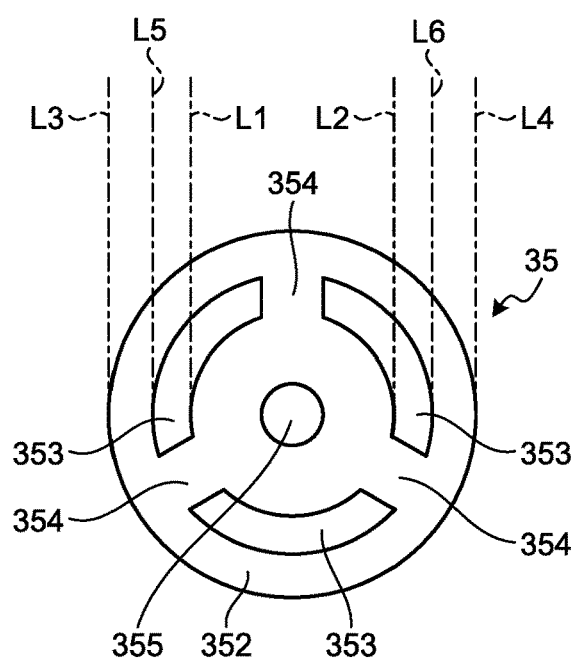
FIG. 6D is a bottom view of a third gear part.

The disc part 352 has an outer diameter formed smaller than the inner diameter (indicated by the alternate long and short dash lines L3 and L4) of the outer circular cylindrical part 322 of the second gear part 32 as illustrated in FIG. 6D, and functions as a lid that holds down the first friction plates 33 and the second friction plates 34 that have been housed in the second gear part 32. A through-hole 355 having a larger diameter than the shaft 31 is provided at the centers of rotation of the third gear part 35 and the disc part 352.

The standing parts 353 are provided on one surface of the disc part 352 in the side thereof opposite to the third gear 351 so as to extend parallel to the rotation axis. The standing parts 353 are formed at intervals of 120 degrees in a rotationally symmetric fashion as illustrated in FIG. 4, FIG. 5, and FIG. 6D and form a substantially cylindrical shape all together. The circular cylindrical shape formed by the standing parts 353 has an outer diameter smaller than the inner diameters of the first friction plate 33 and the second friction plate 34 and has an inner diameter slightly larger than the outer diameter (indicated by the alternate long and short dash lines L1 and L2) of the inner circular cylindrical part 323 of the second gear part 32.

The three protrusions 34a of the second friction plates 34 engage with the three gaps (engagement counterparts) 354 between each adjacent ones of the standing parts 353. Consequently, the third gear 351 and the second friction plates 34 rotate integrally. The third gear 351, the disc part 352, and the standing parts 353 are integrally formed of resin or the like.

The washer 36 is formed of metal or resin and is mounted on the third gear 351 with the shaft 31 inserted therethrough as illustrated in FIG. 3 and FIG. 4. The spring 37 is formed of metal or resin and biases the third gear part 35 toward the second gear part 32 with the shaft 31 inserted therethrough as illustrated in FIG. 3 and FIG. 4. The nut 38 is screwed around a screw 31a formed on a front end portion of the shaft 31 as illustrated in FIG. 3 and FIG. 4, thereby anchoring the spring 37 to the shaft 31 and imparting compressive force to the spring 37. Force that is applied by the spring 37 to the first friction plates 33 and the second friction plates 34 via the third gear part 35 and that presses these friction plates toward the second gear part 32 is controlled by the degree to which the nut 38 is tightened.

Next, how the torque limiter 30 having the above structure is constructed is described with reference to FIG. 5.

In the first place, the shaft 31 is inserted through and fitted with the shaft hole 326 of the inner circular cylindrical part 323 of the second gear part 32. Consequently, the second gear part 32 is pivotally supported by and fixed to the shaft 31, and rotates integrally therewith.

Subsequently, the five first friction plates 33 and the second friction plates 34 are alternately stacked while being aligned with one another, and are housed in a housing part (the hollow part 327) formed by the bottom plate 321, the outer circular cylindrical part 322, and the inner circular cylindrical part 323 of the second gear part 32. At this step, the projections 33a of the first friction plates 33 are engaged with the notches 325 of the outer circular cylindrical part 322 of the second gear part 32. The inside of the housing part may be filled up with grease as needed. Instead of application of grease, a resin sheet or the like may be inserted between adjacent ones of the first friction plates 33 and the second friction plates 34 in order to obtain stable frictional force.

The shaft 31 is inserted through the third gear part 35 and fitted therewith in a manner such that three protrusions 34a of the second friction plates 34 engage with the three gaps 354 between each adjacent ones of the standing parts 353.

Subsequently, the washer 36, the spring 37, and the nut 38 are fitted in with the shaft 31 in this order. The degree to which the nut 38 is tightened is adjusted to control pressing force applied by the spring 37 to the first friction plates 33 and the second friction plates 34.

This step completes the construction of the torque limiter 30 operable to transmit, to the first gear part 20, torque generated by the motor 10 with friction between each adjacent ones of the first friction plates 33 and the second friction plates 34 and further operable to, in response to an excess load applied thereto from the outside, suppress torque applied to the motor 10 by causing one of each adjacent ones of the first friction plates 33 and the second friction plates 34 to slip on the other.

When the torque limiter 30 is embedded in the electrically powered toilet-seat equipped toilet 2, the second gear 324 is meshed with the gear 10a fitted with and attached to the output shaft of the motor 10, and the small-diameter gear 22 is coupled directly or via a sequence of gears to a gear (not illustrated) coupled to the turning shaft to be driven of the toilet seat 4.

Next, operation of the drive unit 1 having the above-described structure is described. In order to open the toilet seat 4, a controller not illustrated supplies a drive signal to rotate the motor 10 in one direction. The rotation of the motor 10 rotates the gear 10*a* fitted with and attached to the output rotary shaft, thereby rotating the second gear 324 meshed with the gear 10*a*.

The rotation of the second gear 324 causes rotation of the first friction plates 33 having the projections 33*a* that engage with the notches 325 of the second gear part 32. The rotative force of the first friction plates 33 is transmitted to the second friction plates 34 via static frictional force among the first friction plates 33 and the second friction plates 34 and causes rotation of the second friction plates 34. The rotation of the second friction plates 34 rotates the standing parts 353 having engaged with the second friction plates 34, and the rotation of the standing parts 353 rotates the third gear 351 formed integrally with the standing parts 353. The rotation of the third gear 351 rotates the large-diameter gear 21 of the first gear part 20, and the rotation of the large-diameter gear 21 causes the small-diameter gear 22 formed integrally therewith. The rotation of the small-diameter gear 22 is transmitted to the turning shaft of the toilet seat 4, so that the toilet seat 4 is opened. In contrast, in order to close the toilet seat 4, the controller rotates the motor 10 in the reverse direction. In this case, rotative force that brings rotation reverse to the above-described rotation is transmitted to the turning shaft of the toilet seat 4, so that the toilet seat 4 is closed.

On such occasions, application of an excess load to the toilet seat 4 with a user manually closing or opening the toilet seat 4 causes the first gear part 20 to rotate in response to rotation of the turning shaft of the toilet seat 4, thereby causing the third gear 351 meshed with the first gear part 20 to rotate. Furthermore, the standing parts 353 formed integrally with the third gear 351 rotate, which causes the second friction plates 34 having engaged with the standing parts 353 to rotate.

On such occasions, when the excess load applied to the toilet seat 4 exceeds limit torque, that is, exceeds the maximum static frictional force among the first friction plates 33 and the second friction plates 34, the second friction plates 34 slip on an adjacent one of the first friction plates 33, so that rotation of the third gear part 35 is not transmitted to the rest of the second gear part 32 and the motor 10 following the first friction plates 33. In this manner, the motor 10, the gear 10*a*, and the second gear part 32 can be protected when the excess load applied to the toilet seat 4 exceeds the maximum static frictional force among the first friction plates 33 and the second friction plates 34.

Additionally, when an excess load exceeding the limit torque is transmitted to the second gear part 32 from the motor 10 side for some reason, the first friction plate 33 slips on the second friction plate 34, and transmission of the excess load to the third gear part 35 is thus blocked, so that components such as the third gear part 35 and the first gear part 20 can be protected.

The maximum static frictional force among the first friction plates 33 and the second friction plates 34 can be controlled through adjustment of pressing force of the spring 37. Therefore, the degree to which the nut 38 is tightened is adjusted so that the maximum static frictional force between adjacent ones of the first friction plates 33 and the second friction plates 34 can be larger than rotative force needed to be applied by the motor 10 to open or close the toilet seat 4 and can be smaller than rotative force applied between the first friction plate 33 and the second friction plate 34 when a user applies force the toilet seat 4 by hand or some other means. Another tightener such as a U-shape bolt may be used as an alternative to the nut 38. When the pressing force of the spring 37 depending on the length thereof along the rotation axis is previously known, adjustment using the nut 38 is not needed, and the spring 37 may be anchored with an E-RING or a bush so as to have a prescribed length. The length of the spring 37 along the rotary shaft is defined with a nut, an E-RING, a bush, or the like. Fluctuations of the pressing force thereof can therefore be reduced, so that fluctuations of the limit torque can be suppressed. In addition, even when the first friction plate 33 and/or the second friction plate 34 has become worn because of longtime use, the thicknesses of the first friction plate 33 and the second friction plate 34 relative to the length of the spring 37 along the rotary shaft change to a very small extent. The pressing force therefore changes only to a small extent, and the limit torque is expected to suffer only a small change.

The above structure uses a mechanism for blocking transmission of excess load torque by causing one of the first friction plate 33 and the second friction plate 34 to slip on the other, and therefore can be a silent structure without the occurrence of mechanical noise as in the case using a ratchet. Furthermore, certain torque can be set as desired without the occurrence of mechanical noise taken into consideration. If the certain torque is set to a low value, the strength of components can be set to low levels. Cost reduction or component number reduction are thus expected to be achieved by replacement of a metal component with a resin component or replacement of a component composed of a plurality of metal parts with an integrally formed resin component.

The second gear part 32 and the third gear part 35 are pivotally supported by the same shaft 31, and the number of shafts is one. This allows for reduced manufacturing cost as compared with a case having the second gear part 32 and the third gear part 35 pivotally supported by different shafts. The spring 37 biases the second gear part 32 and the third gear part 35 in the same direction, and therefore can press the first friction plates 33 and the second friction plates 34 via one of the gear parts toward the other.

The nut 38 controls force of the spring 37 that biases the second gear part 32 and the third gear part 35 in the same direction, thereby making it possible to control the frictional force among the first friction plates 33 and the second friction plates 34. The first friction plates 33 and the second friction plates 34 are housed inside the outer circular cylindrical part 322 of the second gear part 32. This allows for reduced size as compared with a case without these friction plates inside the outer circular cylindrical part 322. A stack of the first friction plates 33 and the second friction plates 34 is pressed by the third gear part 35, so that rotation of either of the second gear part 32 and the third gear part 35 generates frictional force among the first friction plates 33 and the second friction plates 34.

The engagement of the projections 33*a* with the notches 325 enables the first friction plates 33 and the second gear part 32 to integrally rotate. The engagement of the protrusions 34*a* with the gaps 354 enables the second friction plates 34 and the third gear part 35 to integrally rotate. The stacking arrangement of the first friction plates 33 and the second friction plates 34 enables frictional force to be generated on the first or second friction plates by rotation of the second or first friction plates. This stacking arrangement further enables adjustment of frictional force among the first friction plates 33 and the second friction plates 34 based on the number of friction plates.

The use of gears (the second gear 324 and the third gear 351) as rotary members makes slippage less likely than in a case in which gears are not used but, for example, a roller chain is used. The use of gears as rotary members increases the flexibility in arrangement of the motor 10 and the first gear part 20 as compared with a case in which gears are not used. This makes it easier to adjust the respective positions of the output rotary shaft of the motor 10 and the rotary shaft of the first gear part 20. The use of plate-shaped friction members (the first friction plates 33 and the second friction plates 34) as friction members allows for size reduction compared to a case where plate-shaped friction members are not used. Size reduction can be thus achieved, and the torque limiter 30 needs to occupy a smaller arrangement space in the drive unit 1. The flexibility in arrangement thereof is thus larger than in a case including a larger torque limiter.

The present invention is not limited by the above-described embodiment, and various modifications and applications can be made thereto.

While the embodiment is constructed such that the second gear 324 and the gear 10a inserted through and fitted with the rotary shaft of the motor 10 are meshed with each other, any desired manner may be employed as how rotative force is transmitted to the torque limiter 30. For example, the third gear 351 and the gear 10a may be meshed with each other alternatively. In the case of having the third gear 351 and the gear 10a meshed with each other, the second gear 324 is meshed with the large-diameter gear 21.

While the embodiment includes the spring 37 configured to bias the third gear part 35 toward the second gear part 32 so that frictional force may be generated among the first friction plates 33 and the second friction plate 34, any elastic member such as rubber may be used to generate biasing force. Any member that can generate desired frictional force may be used as an alternative to an elastic member.

While the example illustrates that the first friction plates 33 engage with the second gear part 32 at three locations, any desired number of engagement locations may be employed. Similarly, while the example illustrates that the second friction plates 34 engage with the third gear part 35 at three locations, any desired number of engagement locations may be employed. Any desired manner for engagement and any number of members to engage with one another may be employed that enable transmission of rotative force via frictional force from one gear (rotary member) to another gear (rotary member). For example, a configuration may be employed such that, while the third gear 351 is engaged with the first friction plates 33, the second gear part 32 is engaged with the second friction plates 34.

While the embodiment includes the five first friction plates 33 and the five second friction plates 34, any desired numbers of first and second first friction plates may be included. Frictional force generated among the first friction plates 33 and the second friction plates 34 can be controlled by the number of friction plates. Therefore, an increase in number of first friction plates allows corresponding reduction in the pressing force of the elastic member, thereby allowing the spring 37 to be smaller.

In addition, while torque is transmitted via frictional force among the first friction plates 33 and the second friction plates 34, friction members of any shape, such as cylindrical friction members, that are capable of transmitting torque via friction may be used instead of plate-shaped friction members like the first friction plates 33 and the second friction plates 34.

Second Embodiment

In the drive unit 1 according to the first embodiment, the toilet seat 4 is driven via the third gear part 35 and the first gear part 20, and the first friction plates 33 and the second friction plates 34 are housed in the second gear part 32 formed in a bottomed cylindrical shape. These configurations can be changed and modified as desired.

Figure 7:
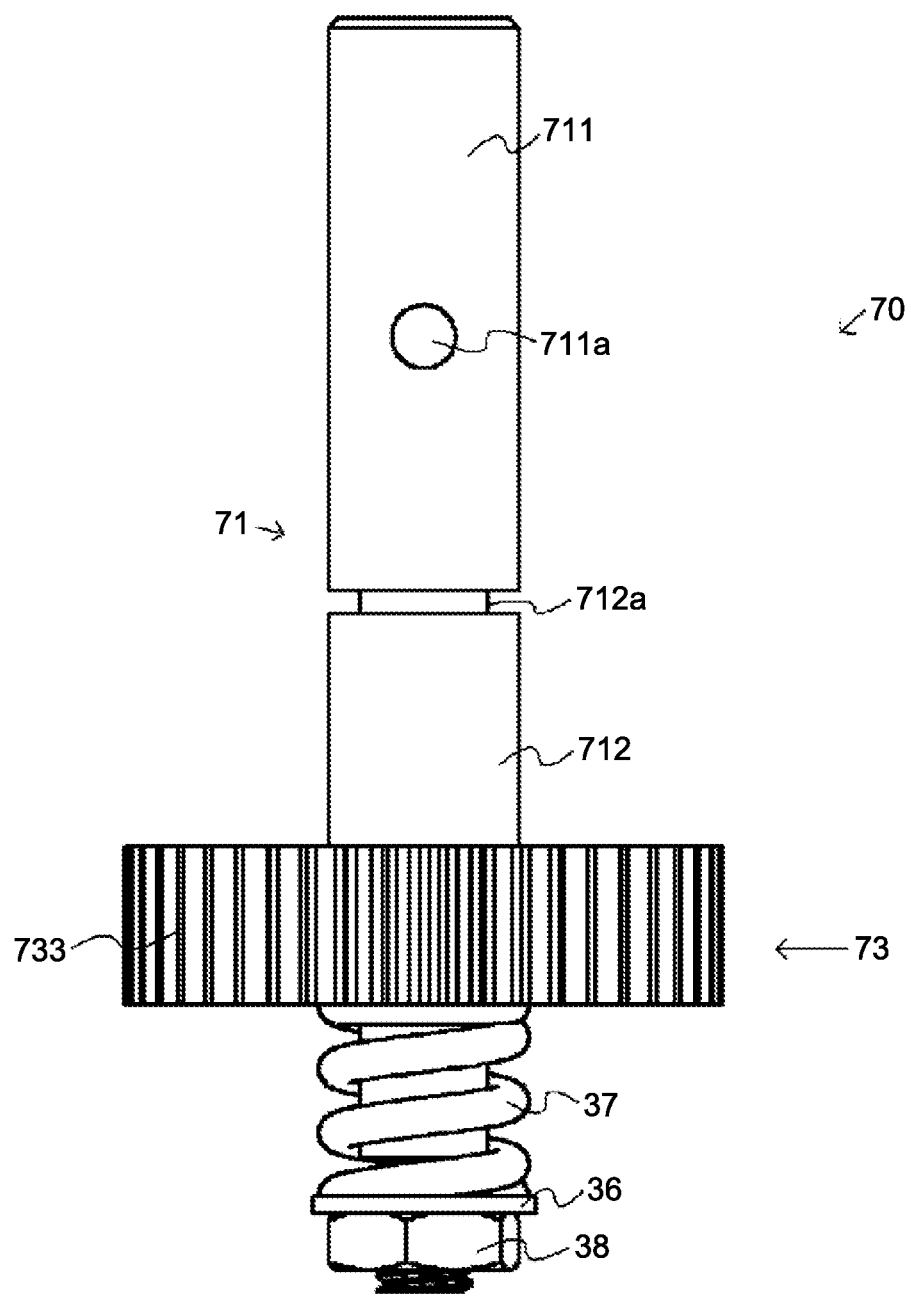
FIG. 7 is a side view of a torque limiter according to a second embodiment of the present invention.
Figure 8:
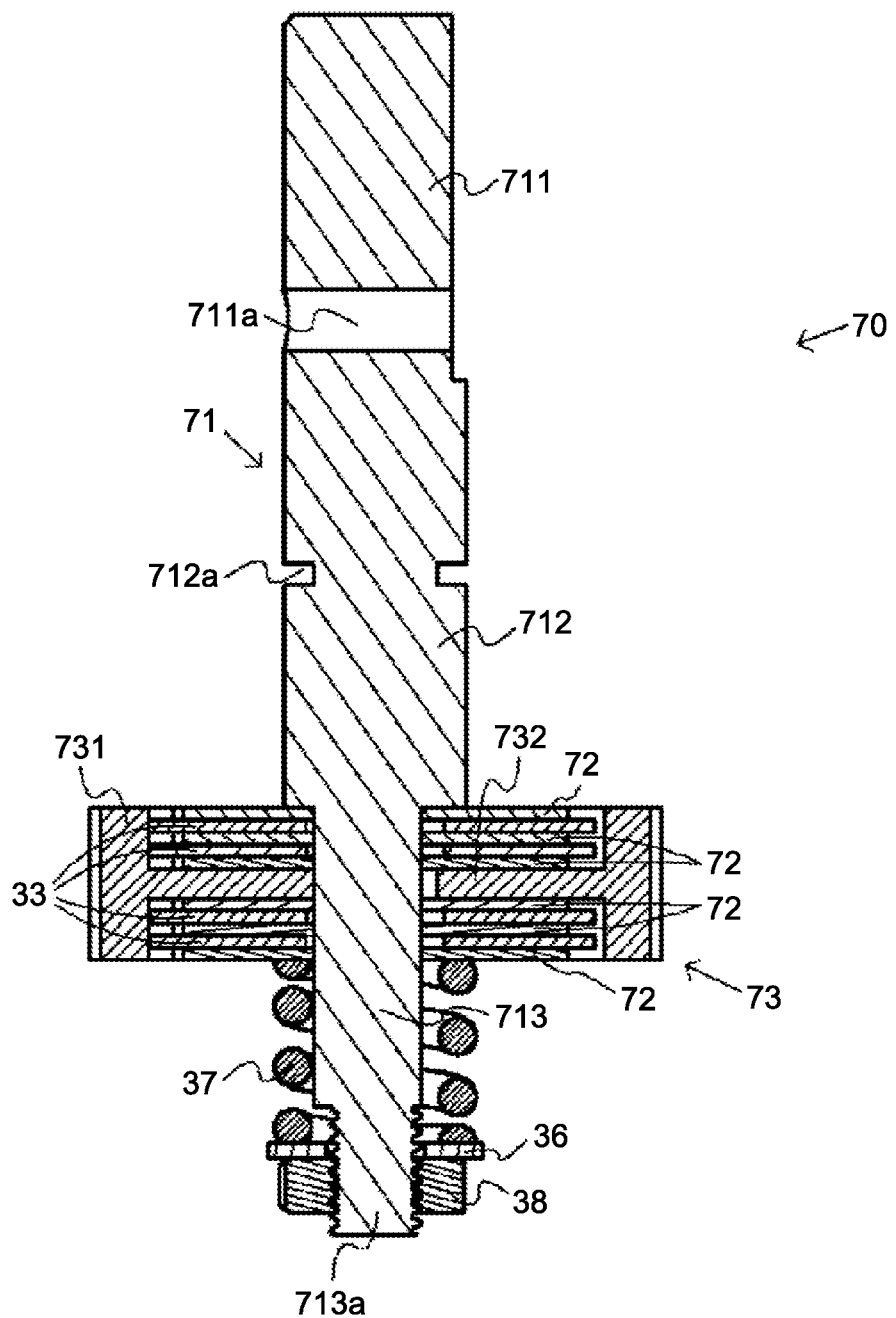
FIG. 8 is a sectional view of the torque limiter according to the second embodiment.
Figure 9:
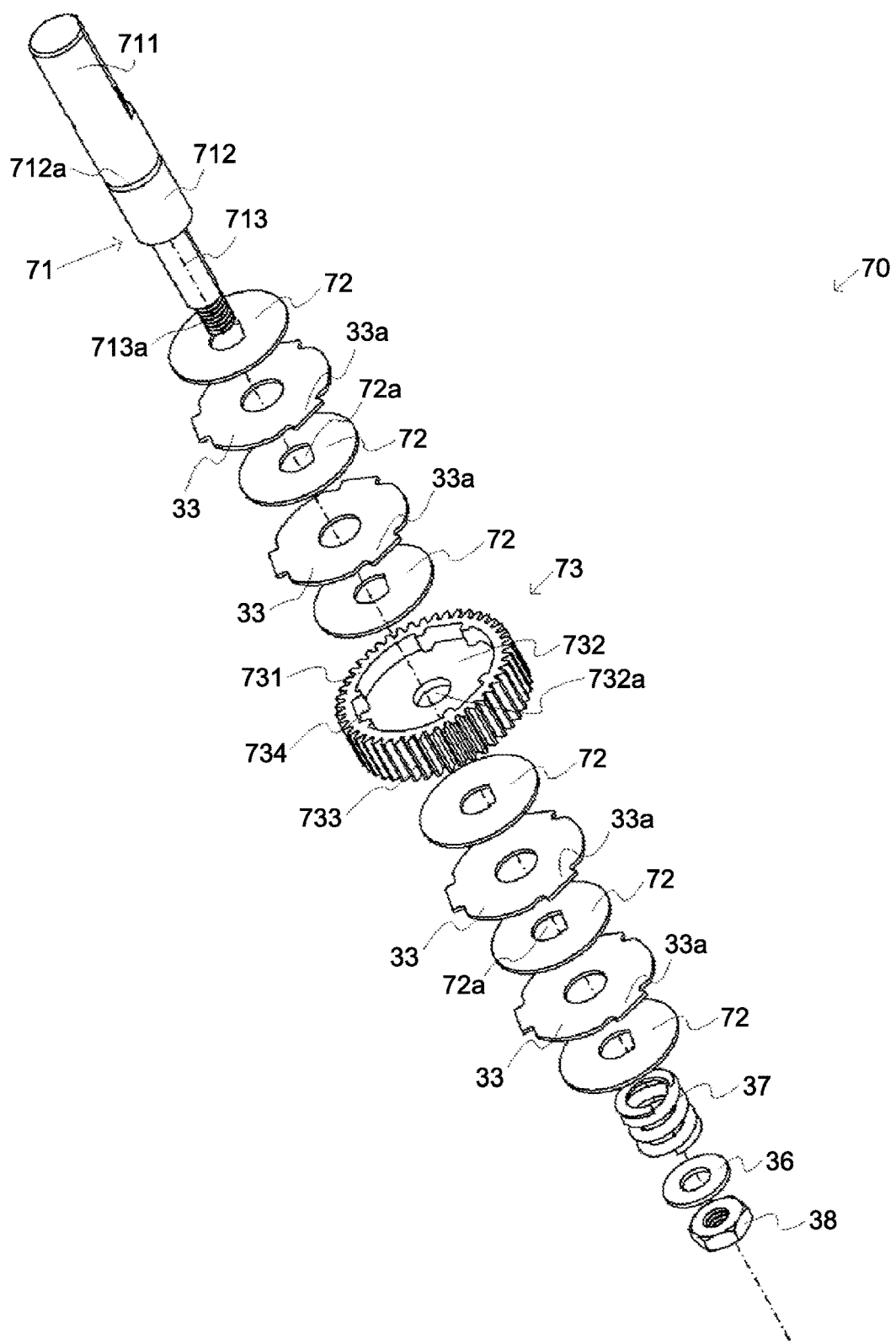
FIG. 9 is an exploded view of the torque limiter according to the second embodiment.

With reference to FIG. 7 to FIG. 9, the following describes, as an example, an exemplary drive device that does not include a first gear part and a third gear part and has first friction plates and second friction plates differently arranged.

As illustrated in FIG. 7 to FIG. 9, a torque limiter 70 according to this embodiment includes a shaft 71, first friction plates 33, second friction plates 72, and a fourth gear part 73. As illustrated in FIG. 8, the shaft 71 includes a D-shaped part 711 having a D-shaped section, a circular columnar part 712, and a narrow-diameter part 713. The D-shaped part is coupled to the turning shaft of the toilet seat 4 of the electrically powered toilet-seat equipped toilet 2.

The D-shaped part 711 is formed through a D-cut process so as to have a D-shaped section perpendicular to the rotation axis thereof, and the section thereof formed coaxially with the turning shaft of the toilet seat 4 of the electrically powered toilet-seat equipped toilet 2 is inserted through an insertion hole having a D-shaped section. The D-shaped part 711 has a threaded hole 711a formed therethrough to which a bolt for preventing idle running and for retaining is attached.

The circular columnar part 712 is formed integrally and coaxially with the D-shaped part 711, and has a groove 712a formed thereon around which a retaining E-RING is attached. While being formed integrally and coaxially with the circular columnar part 712, in a stepped shape, and so as to have narrower diameters, the narrow-diameter part 713 is formed through a D-cut process so that the section thereof can be D-shaped. The narrow-diameter part 713 has an external-thread part 713a formed around the front end thereof.

The fourth gear part 73 includes a circular cylindrical part 731 and a partition plate 732 arranged substantially at the center of the circular cylindrical part 731 in the axial direction thereof.

The circular cylindrical part 731 has a fourth gear 733 formed on the outer circumferential surface thereof and meshed with the gear 10a (see FIG. 1) attached to the output rotary shaft of the motor 10. Notches 734 with which projections 33a of each of the first friction plates 33 engage are formed in the inner circumferential surface of the circular cylindrical part 731. The notches 734 are formed in both sides of the partition plate 732. At the center of the circle of the partition plate 732, a circular through-hole 732a to be penetrated by the narrow-diameter part 713 of the shaft 71 is provided. The fourth gear 733 may be coupled to the gear 10a via a sequence of gears not illustrated.

In each space formed in the fourth gear part 73 by the circular cylindrical part 731 and the partition plate 732, a stack of the first friction plates 33 and the second friction plates 72 is housed.

The first friction plates 33 are arranged so that the projections 33a thereof can engage with the notches 734 formed on the inner side of the circular cylindrical part 731.

As illustrated in FIG. 9, each of the second friction plates 72 is formed in a disc-like shape and has a D-shaped opening 72a formed at the center through which the narrow-diameter part 713, a part in the shaft 71 where a section is D-shaped, is inserted.

The narrow-diameter part 713 of the shaft 71 has a spring 37 attached therearound that presses the first friction plates 33 and the second friction plates 72 housed in the fourth gear part 73, and the external-thread part 713a has a nut 38 screwed therewith that anchors the spring 37.

In this configuration, the first friction plates 33 and the second friction plates 72 are housed in the fourth gear part 73 while being pressed by the spring 37 and a step portion between the circular columnar part 712 and the narrow-diameter part 713 in the shaft 71.

In the torque limiter 70 thus configured, the fourth gear 733 is rotated by rotation of the gear 10a fitted with and attached to the output rotary shaft of the motor 10. When the fourth gear 733 in the fourth gear part 73 rotates, the first friction plates 33 having the projections 33a engaging with the notches 734 rotate with the rotation of the fourth gear 733. With the rotation of the first friction plates 33, frictional force causes the second friction plates 72 to rotate. The rotation of the second friction plates 72 causes the narrow-diameter part 713 of the shaft 71 engaging with the D-shaped openings 72a of the second friction plates 72 to rotate. The rotation of the narrow-diameter part 713 causes the D-shaped part 711 also to rotate, so that the toilet seat 4 coupled to the D-shaped part 711 turns.

Separately, when an excess load is applied to the toilet seat 4, the excess load is transmitted to the second friction plates 72 via the shaft 71. If the excess load is larger than the maximum static frictional force between adjacent ones of the first friction plates 33 and the second friction plates 72, the second friction plates 72 slip on the first friction plates 33, and the first friction plates 33 do not rotate. In this manner, an incidence of having an excess load applied to the toilet seat 4 transmitted to the motor 10 is prevented, and the motor 10 and gears can therefore be protected. When an excessively large excess load is applied from the motor 10 side to the fourth gear part 73, transmission of torque to the shaft 71 is prevented similarly.

With the above structure, the shaft 71 pivotally supporting the fourth gear part 73 and the D-shaped part 711 are formed as an identical (integral) body. This allows for size reduction as compared with a case having the shaft 71 and the D-shaped part 711 formed as separate bodies. The first friction plates 33 and the second friction plates 72 are pressed by the step portion, so that rotation of the first friction plates 33 or the second friction plates 72 generates frictional force among the first friction plates 33 and the second friction plates 72.

While the embodiments of the present invention have been described above, the present invention can be carried out in various embodiments and modifications without departing from the board spirit and scope of the present invention.

For example, while the second embodiment employs a configuration such that the fourth gear 733 and the gear 10a inserted through and fitted with the rotary shaft of the motor 10 are meshed with each other, another configuration may be alternatively employed such that a gear (not illustrated) coupled to the shaft 71 and the gear 10a are meshed with each other. In this case, the fourth gear 733 meshes with a gear coupled to the turning shaft (opening/closing drive shaft) of the toilet seat 4.

While an exemplary configuration of the second gear part 32 such that the bottom plate is included at one end portion of the gear has been illustrated in the first embodiment, another gear that includes a partition plate at the central portion thereof may be alternatively used as in the second embodiment. Similarly to the first embodiment, a configuration such that a bottom plate is included at one end portion of the gear may be alternatively employed in the second embodiment.

In the first embodiment, an exemplary torque limiter has been illustrated in which: rotative force is transmitted from the second gear part 32 to the third gear part 35; and transmission of excess torque from the third gear part 35 to the second gear part 32 is blocked. In the second embodiment, another exemplary torque limiter has been illustrated in which: rotative force is transmitted from the fourth gear part 73 to the shaft 71; and transmission of excess torque from the shaft 71 to the fourth gear part 73 is blocked. This invention is not limited to these examples, and is broadly applicable to a configuration in which: rotative force is transmitted from any first rotary member to any second rotary member; and, upon application of excess torque to either of these rotary members, transmission thereof from the one to the other of the rotary members is blocked. For example, this invention is applicable to a configuration in which, while rotative force of a pulley is transmitted to another pulley or a shaft, transmission of excess torque from the one to the other of the rotary members is blocked.

Furthermore, while a toilet seat and a lid of a toilet have been described as examples of a target to be driven by the drive device, the present invention is applicable to a drive device that drives, or opens and closes, any target to be driven thereby. For example, the present invention is applicable also to an opening/closing mechanism for industrial machinery and an elevating mechanism for lifting elevators.

According to an aspect of the present invention, it is capable of suppressing influence of an excess load to components thereof and is silently operable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A torque limiter comprising:
   a first rotary member configured to be rotated by a drive source;
   at least one first friction member engaged with the first rotary member;
   at least one second friction member arranged so as to overlap the first friction member, and configured to rotate with rotation of the first rotary member by using frictional force generated between the second friction member and the first friction member; and
   a second rotary member engaged with the second friction member, wherein
   the first friction member and the second friction member are housed in a housing part in the first rotary member while being stacked on each other, and
   the second rotary member is arranged while pressing a stack of the first friction member and the second friction member,
   the first friction member and the second friction member have annular shapes,
   the first friction member has an engaging part on an outer circumferential portion thereof, the engaging part of the first friction member being configured to engage with an engagement counterpart formed in the housing part in the first rotary member, the second friction member has an engaging part on an inner circumferential portion thereof, and the second rotary member penetrates a hollow part formed in the first friction member and has an engagement counterpart with which the engaging part of the second friction member engages.

2. The torque limiter according to claim 1, wherein the first rotary member and the second rotary member are pivotally supported by an identical rotary shaft, and while either one of the first rotary member and the second rotary member is fixed to the rotary shaft, the other one is supported so as to be rotatable about the rotary shaft.

3. The torque limiter according to claim 2, further comprising:

an elastic member attached to the rotary shaft; and a tightener attached to the rotary shaft, wherein the elastic member biases the first rotary member and the second rotary member in an identical direction, and the tightener anchors the elastic member to the rotary shaft.

4. The torque limiter according to claim 3, wherein the tightener controls force for the biasing.

5. The torque limiter according to claim 1, wherein the second rotary member is constructed of a rotary shaft that pivotally supports the first rotary member in a manner enabling the first rotary member to rotate, the first friction member is pivotally supported by the rotary shaft so as to be rotatable, and the rotary shaft is inserted through and fitted with the second friction member.

6. The torque limiter according to claim 5, wherein the rotary shaft includes a large-diameter part and a small-diameter part having a diameter smaller than the large-diameter part, and has a step portion between the large-diameter part and the small-diameter part, the first friction member and the second friction member are housed in a housing part in the first rotary member while being stacked on each other, and the rotary shaft pivotally supports the first friction member and the second friction member at the small-diameter part and presses a stack of the first friction member and the second friction member at the step portion.

7. The torque limiter according to claim 1, wherein at least one of the at least one friction member and the at least one second friction member includes a plurality of such friction members, and the first friction members and the second friction members are arranged while being alternately stacked.

8. The torque limiter according to claim 1, wherein the first friction member transmits rotative force to the second friction member by using frictional force among the first friction member and the second friction member, the rotative force from the first friction member having been generated by rotation of the first rotary member, and, when an excess load larger than a maximum static frictional force between the first friction member and the second friction member is applied to the first rotary member, the excess load applied to the first rotary member is not transmitted to the second rotary member because the first friction member slips on the second friction member.

9. The torque limiter according to claim 1, wherein the first rotary member and the second rotary member are gears, and the first friction member and the second friction member are plate-shaped.

10. A drive device comprising:

the torque limiter according to claim 1;

a motor configured to drive and rotate the first rotary member; and a gear configured to transmit rotation of the second rotary member to a target to be driven.

* * * * *